(12) United States Patent
Lim et al.

(10) Patent No.: US 10,963,154 B2
(45) Date of Patent: Mar. 30, 2021

(54) ELECTRONIC DEVICE AND METHOD OF CONTROLLING THE SAME

(71) Applicants: Samsung Display Co., Ltd., Yongin-Si (KR); Industry-Academic Cooperation Foundation, Yonsei University, Seoul (KR)

(72) Inventors: Jaeik Lim, Hwaseong-si (KR); Minwoo Kim, Hwaseong-si (KR); Wonsang Park, Yongin-si (KR); Hyeyong Chu, Hwaseong-si (KR); Kyungbo Min, Seoul (KR); Dayoung Ju, Incheon (KR)

(73) Assignees: SAMSUNG DISPLAY CO., LTD., Gyeonggi-Do (KR); INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 95 days.

(21) Appl. No.: 16/189,460

(22) Filed: Nov. 13, 2018

(65) Prior Publication Data
US 2019/0146834 A1 May 16, 2019

(30) Foreign Application Priority Data
Nov. 15, 2017 (KR) .................. 10-2017-0152584

(51) Int. Cl.
| G06F 9/46 | (2006.01) |
| G06F 3/0488 | (2013.01) |
| G06F 9/48 | (2006.01) |
| G06F 3/0484 | (2013.01) |
| G06F 1/16 | (2006.01) |

(Continued)

(52) U.S. Cl.
CPC .......... *G06F 3/0488* (2013.01); *G06F 1/1686* (2013.01); *G06F 3/016* (2013.01); *G06F 3/0484* (2013.01); *G06F 9/4843* (2013.01); *G06F 3/0236* (2013.01); *G06F 3/04886* (2013.01); *G06F 2203/04105* (2013.01)

(58) Field of Classification Search
CPC ........ G06F 3/041; G06F 3/0236; G06F 3/045; G06F 1/1694; G06F 1/1656; G06F 1/1626; G06F 3/016; G06F 3/04886; G06F 3/0484; G06F 3/0488; G06F 9/4843; G06F 1/1686; H04N 1/2112; H04N 5/772; H04W 76/14; H04B 1/3888
See application file for complete search history.

(56) References Cited

U.S. PATENT DOCUMENTS 7,497,687 B2  3/2009  Shin
8,494,497 B2  7/2013  Seo et al.
(Continued)

FOREIGN PATENT DOCUMENTS

JP  6073253 B2  2/2017
KR  100568695 B1  4/2006
(Continued)

*Primary Examiner* — Tuan A Vu
(74) *Attorney, Agent, or Firm* — Cantor Colburn LLP

(57) ABSTRACT

An electronic device includes a control unit determining a program being executed, a display unit including a display area of which a portion is protruded or recessed corresponding to an operation of the determined program, and an input sensor unit sensing an external input applied to the protruded or recessed portion.

17 Claims, 14 Drawing Sheets

(51) Int. Cl.
*G06F 3/01* (2006.01)
*G06F 3/023* (2006.01)

(56) References Cited

U.S. PATENT DOCUMENTS

| | | | |
|---|---|---|---|
| 8,830,163 B2 | 9/2014 | Sim et al. | |
| 8,982,051 B2 | 3/2015 | Rosenfeld et al. | |
| 9,189,597 B2 | 11/2015 | Bluemler et al. | |
| 9,542,820 B2 | 1/2017 | Moussette et al. | |
| 9,880,624 B2 | 1/2018 | Bae et al. | |
| 2005/0030292 A1 | 2/2005 | Diederiks | |
| 2007/0229473 A1 | 10/2007 | Kim et al. | |
| 2007/0275703 A1 | 11/2007 | Lim et al. | |
| 2008/0291058 A1* | 11/2008 | Park | G06F 1/1626 341/22 |
| 2012/0250242 A1* | 10/2012 | Graneto, III | G06F 1/1656 361/679.26 |
| 2013/0286251 A1* | 10/2013 | Wood | H04N 5/772 348/231.99 |
| 2014/0129933 A1* | 5/2014 | Eleftheriou | G06F 3/0236 715/702 |
| 2014/0232668 A1* | 8/2014 | Kim | G06F 3/041 345/173 |
| 2014/0354570 A1* | 12/2014 | Makinen | G06F 3/041 345/173 |
| 2015/0065046 A1* | 3/2015 | Wilfred | H04W 76/14 455/41.2 |
| 2015/0227249 A1* | 8/2015 | Kim | G06F 1/1694 345/173 |
| 2015/0338920 A1* | 11/2015 | Feng | G06F 3/04886 345/173 |
| 2015/0358498 A1* | 12/2015 | Eom | H04N 1/2112 348/231.99 |
| 2016/0183364 A1 | 6/2016 | Choi et al. | |
| 2016/0188181 A1* | 6/2016 | Smith | G06F 3/045 715/765 |
| 2016/0197637 A1* | 7/2016 | Lee | H04B 1/3888 455/566 |

FOREIGN PATENT DOCUMENTS

| | | |
|---|---|---|
| KR | 100767686 B1 | 10/2007 |
| KR | 101004816 B1 | 12/2010 |
| KR | 101128803 B1 | 3/2012 |
| KR | 101253168 B1 | 4/2013 |
| KR | 101518490 B1 | 5/2015 |
| KR | 101615872 B1 | 4/2016 |
| KR | 1020160076003 A | 6/2016 |
| KR | 101661786 B1 | 9/2016 |
| KR | 1020170037664 A | 4/2017 |
| KR | 1020180045968 A | 5/2018 |

\* cited by examiner

10

ELECTRONIC DEVICE AND METHOD OF CONTROLLING THE SAME

This application claims priority to Korean Patent Application No. 10-2017-0152584, filed on Nov. 15, 2017, and all the benefits accruing therefrom under 35 U.S.C. § 119, the content of which in its entirety is herein incorporated by reference.

BACKGROUND

1. Field

The disclosure relates to an electronic device including a display area capable of being partially protruded or recessed, and a method of controlling the electronic device.

2. Description of the Related Art

In recent years, with the development of digital technology, various types of electronic device, such as a mobile communication terminal, a smart phone, a tablet personal computer, a personal digital assistant, a digital diary, a notebook computer, a wearable device, etc., are widely used.

In addition, such an electronic device may display an image to allow a user to recognize information on the image, not only through a visual sense, but also through a tactile sense.

SUMMARY

The disclosure relates to an electronic device including a display area in which a tactile area is defined by protruding or recessing from a portion of the display area and being controlled by an external input through the tactile area.

The disclosure provides a method of controlling the electronic device by applying the external input to the protruded or recessed portion of the display area.

According to an embodiment of the invention, an electronic device includes a memory unit which stores a plurality of programs, a control unit which determines a program to be executed among the programs to control the determined program, a display unit including a display area defined therein to display an image, where the display area includes a tactile area protruded or recessed corresponding to an operation of the determined program, and an input sensor unit which senses an external input applied to the tactile area.

In an embodiment, the control unit may control the determined program in response to the external input sensed by the input sensor unit.

In an embodiment, the determined program may be a phone call receiving program that determines whether to receive an incoming call, and the tactile area may include a receiving area to accept the incoming call and a rejection area to reject the incoming call.

In an embodiment, the memory unit may further include a plurality of contact information, at least one of the contact information is selected by a user, and the tactile area may further include an important phone call notification area protruded or recessed when the incoming call is from the selected at least one of the contact information.

In an embodiment, the electronic device may further include a sensor unit which senses an external environment, where the sensor unit includes at least one of an illuminance sensor which senses a brightness, a sound sensor which senses a sound, a position sensor which senses a position, an acceleration sensor which senses an acceleration, and a gyro sensor which senses an angular velocity. In such an embodiment, the tactile area may be activated when the sensed external environment satisfies a predetermined condition.

In an embodiment, the predetermined condition may indicate that the user is in a movie theater.

In an embodiment, the predetermined condition may be preset by the user, and the preset condition is stored in the memory unit.

In an embodiment, the electronic device may further include a camera unit which captures an image, and the determined program may be a camera program to drive the camera unit, and the tactile area may include a shutter area to take a picture using the camera unit.

In an embodiment, the tactile area may further include an exposure control area to control an aperture value or a shutter speed of the camera unit.

In an embodiment, the exposure control area may have a size varying as the aperture value or the shutter speed is changed.

In an embodiment, the camera unit may include a front camera unit which captures an image in a front direction in which the image is displayed through the display area and a rear camera unit which captures an image in a rear direction opposite to the front direction. In such an embodiment, the shutter area and the exposure control area may be activated when the user takes a selfie using the rear camera unit.

In an embodiment, the determined program may be a player program to play an audio file or a video file, and the tactile area may include a play position search area to control a position in the audio or the video file being played.

In an embodiment, the tactile area may include a sound volume control area to control a sound volume of the audio or video file being played.

In an embodiment, the determined program may be a player program to play an audio file or a video file, and the tactile area may include a list search area to search through a playlist of the audio or video files.

In an embodiment, the determined program may be a player program to play an audio file or a video file, and the tactile area may be defined by a portion corresponding to a touch portion where the user touches while the audio or video file is played.

In an embodiment, the tactile area may be defined by protruding the touch portion.

In an embodiment, the tactile area may be defined by recessing a peripheral area surrounding the touch portion.

According to another embodiment of the invention, a method of controlling an electronic device includes determining a program to be executed among a plurality of programs stored in the electronic device, protruding or recessing a portion of a display area of the electronic device to form a tactile area corresponding to an operation of the determined program, and sensing an external input applied to the tactile area or an area adjacent to the tactile area.

In an embodiment, the method may further include controlling the determined program in response to the external input.

In an embodiment, the method may further include sensing an external environment, and the tactile area is formed when the sensed external environment satisfies a predetermined condition.

According to embodiments, the electronic device may allow a user to check the information displayed in the display area through the tactile sense even when it is difficult for the user to visually check the display area.

In such embodiments, the user may control the program executed in the electronic device by touching or swiping the protruded or recessed portion of the display area.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1A:
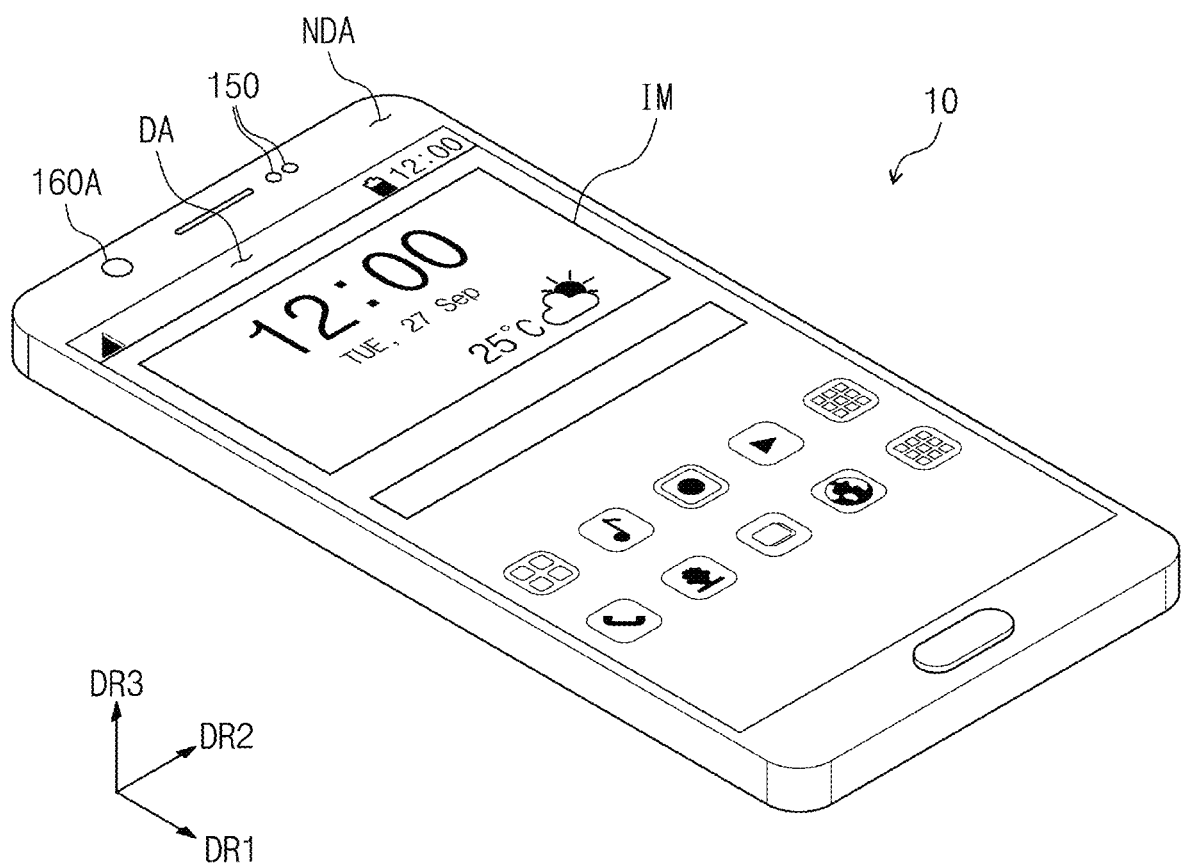
FIGS. 1A and 1B are perspective views showing an electronic device according to an exemplary embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the invention will be described in detail with reference to the accompanying drawings.

Figure 1B:
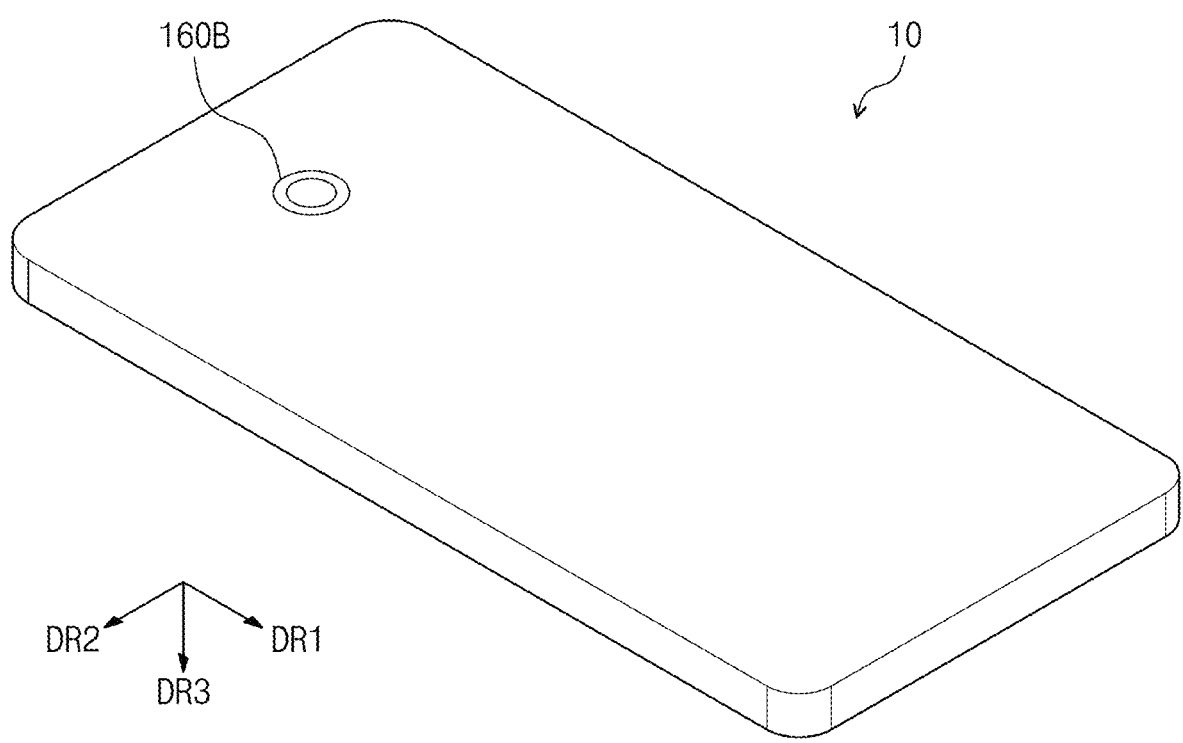
Figure 2:
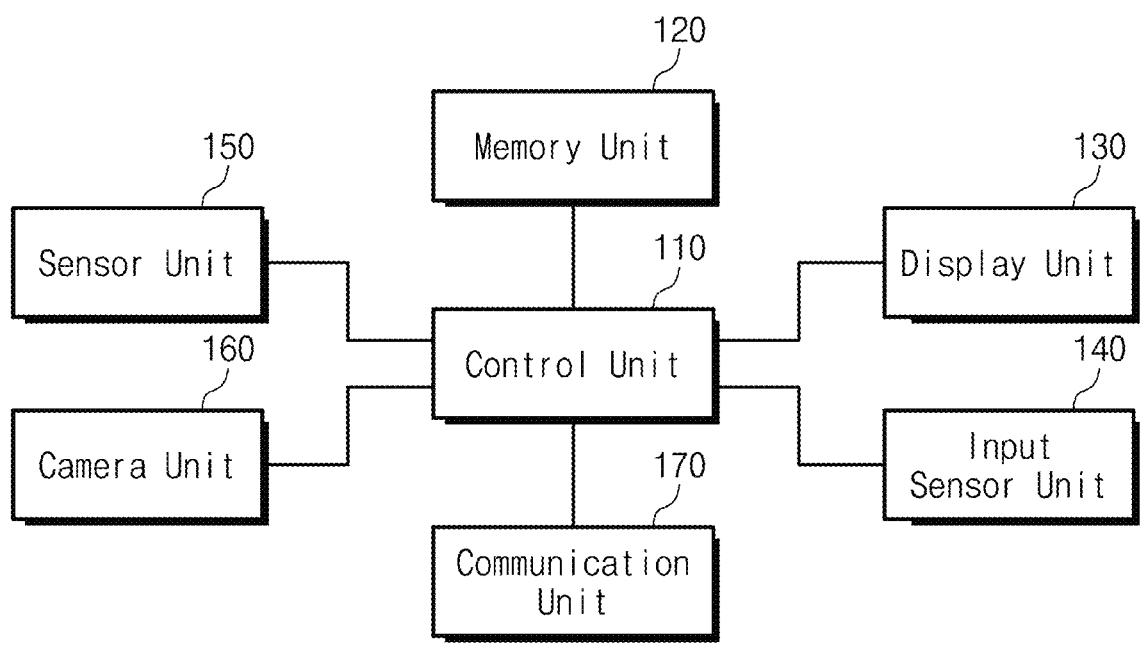
FIG. 2 is a block diagram showing an electronic device according to an exemplary embodiment of the disclosure.

FIGS. 1A and 1B are perspective views showing an electronic device 10 according to an exemplary embodiment of the disclosure. FIG. 2 is a block diagram showing the electronic device 10 according to an exemplary embodiment of the disclosure.

FIG. 1A is a perspective view showing a front surface of the electronic device 10, and FIG. 1B is a perspective view showing a rear surface of the electronic device 10. FIGS. 1A and 1B show an exemplary embodiment where the electronic device 10 is a smart phone, but the electronic device 10 should not be limited thereto. Alternatively, the electronic device 10 may be a large-sized electronic device, such as a television set, a monitor, etc., or a small and medium-sized electronic device, such as a mobile phone, a tablet computer, a car navigation unit, a game unit, a smart watch, etc.

The electronic device 10 may include a display area DA and a non-display area NDA, which are defined therein, e.g., on a display surface thereof.

The display area DA, on which an image IM is displayed, is substantially parallel to a surface defined by a first directional axis DR1 and a second directional axis DR2. A third directional axis DR3 indicates a normal line direction of the display area DA, e.g., a thickness direction of the electronic device 10. Front (or upper) and rear (or lower) surfaces of each element of the electronic device 10 are distinguished from each other by the third directional axis DR3. However, directions indicated by the first, second and third directional axes DR1, DR2, and DR3 may be relative to each other and changed to other directions. Hereinafter, first, second and third directions respectively correspond to directions indicated by the first, second and third directional axes DR1, DR2 and DR3, and the first, second and third directions will be labeled with the same reference numerals as the first, second and third directional axes DR1, DR2 and DR3.

The non-display area NDA is disposed adjacent to the display area DA, and the image IM is not displayed in the non-display area NDA. The electronic device 10 may include a bezel area defined by the non-display area NDA. FIG. 1A shows application icons and a clock widget as an example of the image IM.

In one exemplary embodiment, for example, the display area DA may have a quadrangular shape, and the non-display area NDA may surround the display area DA, but it should not be limited thereto or thereby. The shapes of the display area DA and the non-display area NDA may be variously modified.

In an exemplary embodiment, as shown in FIG. 2, the electronic device 10 includes a control unit 110, a memory unit 120, a display unit 130, an input sensor unit 140, a sensor unit 150, a camera unit 160 and a communication unit 170. Each of the control unit 110, the memory unit 120, the display unit 130, the input sensor unit 140, the sensor unit 150, the camera unit 160 and the communication unit 170 includes an electrical circuit.

The control unit 110 includes a central processing unit ("CPU"), an application processor ("AP"), or a communication processor ("CP").

In an exemplary embodiment, the control unit 110 controls another component of the electronic device 10 and/or performs a calculation operation on an application execution or a data processing operation. In such an embodiment, the control unit 110 determines and controls a program stored in the memory unit 120 or a program that is executed.

The memory unit 120 includes a volatile and/or non-volatile memory. The memory unit 120 stores command or data in associated with other components of the electronic device 10. The memory unit 120 stores software and/or program. The program includes a kernel, a middleware, an application programming interface ("API"), and/or an application program (or application). At least one of the kernel, the middleware, or the API may be referred to as an operating system ("OS").

The display unit 130 includes a liquid crystal display ("LCD"), a light emitting diode ("LED") display, an organic light emitting diode ("OLED") display, a microelectromechanical system ("MEMS") display, or an electronic paper display ("EPD").

The display unit 130 provides a user with various visual information, such as a text, an image, a video, an icon or a symbol, for example.

The display area DA is defined by the display unit 130. In an exemplary embodiment, at least some of the components of the display unit 130 are protruded or recessed in the third direction DR3.

The input sensor unit 140 includes a touch sensing circuit. The touch sensing circuit may operate in at least one of a capacitive type method, a resistive type method, an infrared type method, or an ultrasonic type method. The input sensor unit 140 further includes a tactile layer to provide a tactile response to the user. The input sensor unit 140 further has a pressure sensing function.

The sensor unit 150 measures a physical quantity or senses an operation state of the electronic device 10, and converts the measured or sensed information to an electrical signal. The sensor unit 150 includes at least one of a gesture sensor, a gyro sensor which senses an angular velocity, a pressure sensor, a magnetic sensor, an acceleration sensor, a grip sensor, a proximity sensor, a color sensor, a biometric sensor, a temperature/humidity sensor, an illuminance sensor for sensing brightness, an ultraviolet ("UV") light sensor, a sound sensor for sensing a sound, a position sensor for sensing a position (e.g., a global positioning system ("GPS") sensor), or a flexible sensor for sensing a bending (or bending degree) of the electronic device.

The camera unit 160 is provided to take pictures or to capture images. The camera unit 160 takes a still image and a moving image. The camera unit 160 includes at least one image sensor (e.g., a front sensor or a rear sensor), a lens, an image signal processor ("ISP"), or a flash.

The camera unit 160 includes a front camera unit 160A to take pictures in a front direction and a rear camera unit 160B to take pictures in a rear direction.

The communication unit 170 includes a wireless communication module and a wired communication module. The wireless communication module includes a long-distance communication module and a short-distance communication module.

The long-distance communication module includes a long-term evolution ("LTE"), an LTE advance ("LTE-A"), a code division multiple access ("CDMA"), a wideband CDMA ("WCDMA"), a universal mobile telecommunications system ("UMTS"), a wireless broadband ("WiBro"), or a global systems for mobile communications ("GSM"), but should not be limited thereto or thereby. The long-distance communication module may be changed in response to changes in communication technologies.

The long-distance communication module provides a voice communication, a video communication, a text service, or an internet service through a communication network. According to an embodiment, the long-distance communication module distinguishes or authenticates the electronic device in the communication network using a subscriber identity module (e.g., an SIM card).

The short-distance communication module includes a wireless fidelity ("WiFi"), a Bluetooth, a near field communication ("NFC"), a global navigation satellite system ("GNSS") or a GPS, but it should not be limited thereto or thereby. The short-distance communication module may be changed in response to changes in communication technologies.

The wired communication module includes a universal serial bus ("USB"), a high definition multimedia interface ("HDMI"), a recommended standard232 ("RS232"), or a plain old telephone service ("POTS"), but it should not be limited thereto or thereby. The wired communication module may be changed in response to changes in communication technologies.

Although not shown in figures, at least some of the control unit 110, the memory unit 120, the display unit 130, the input sensor unit 140, the sensor unit 150, the camera unit 160, and the communication unit 170 are connected to each other by a bus. The bus may be a path to deliver data or power between internal and external components of the electronic device 10.

According to an embodiment of the disclosure, the display unit 130 and the input sensor unit 140 may be implemented in a single unified structure. In such an embodiment, the display unit 130 may function as the input sensor unit 140, or the input sensor unit 140 may function as the display unit 130.

Figure 3:
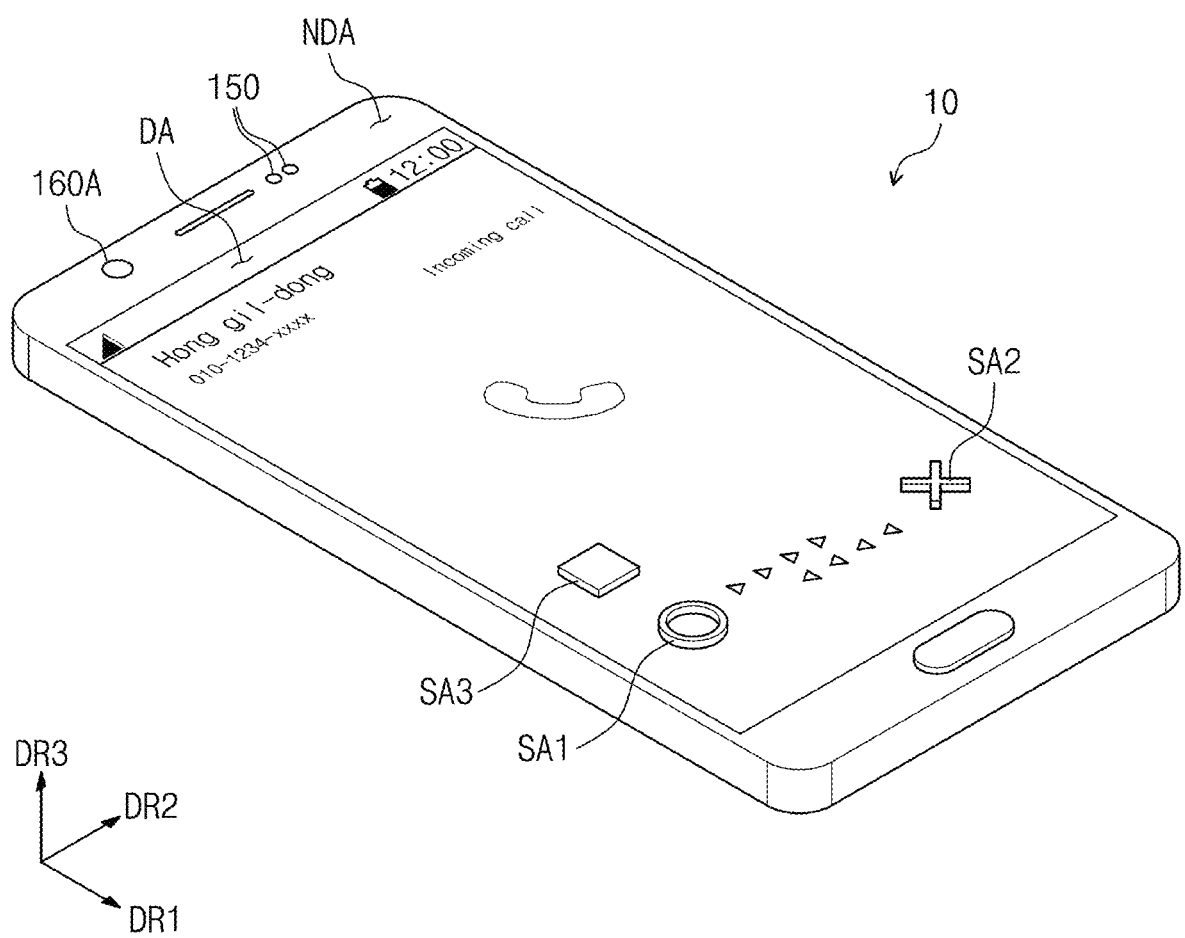
FIG. 3 is a perspective view showing an electronic device according to an exemplary embodiment of the disclosure.
Figure 4:
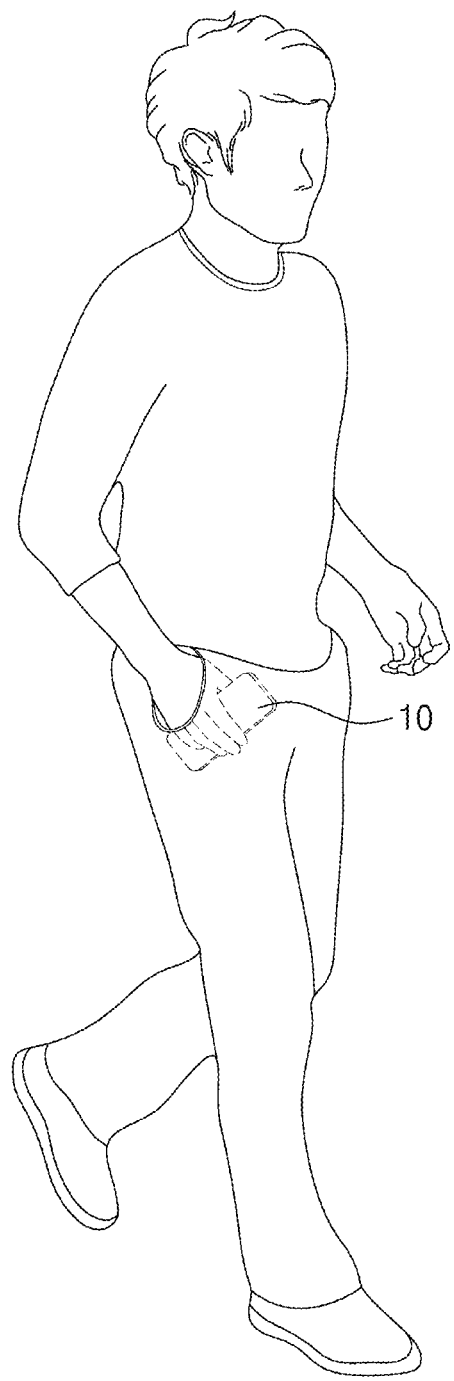
FIGS. 4 and 5 are views showing environments in which a user uses an electronic device according to an exemplary embodiment of the disclosure.
Figure 5:
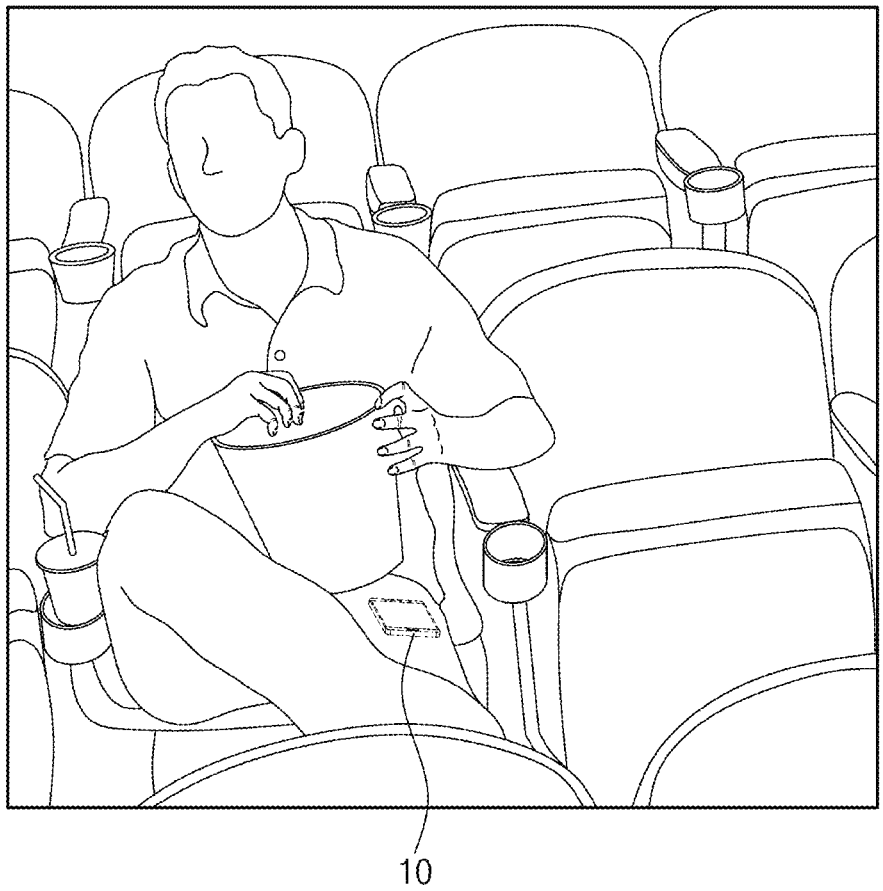
Figure 6:
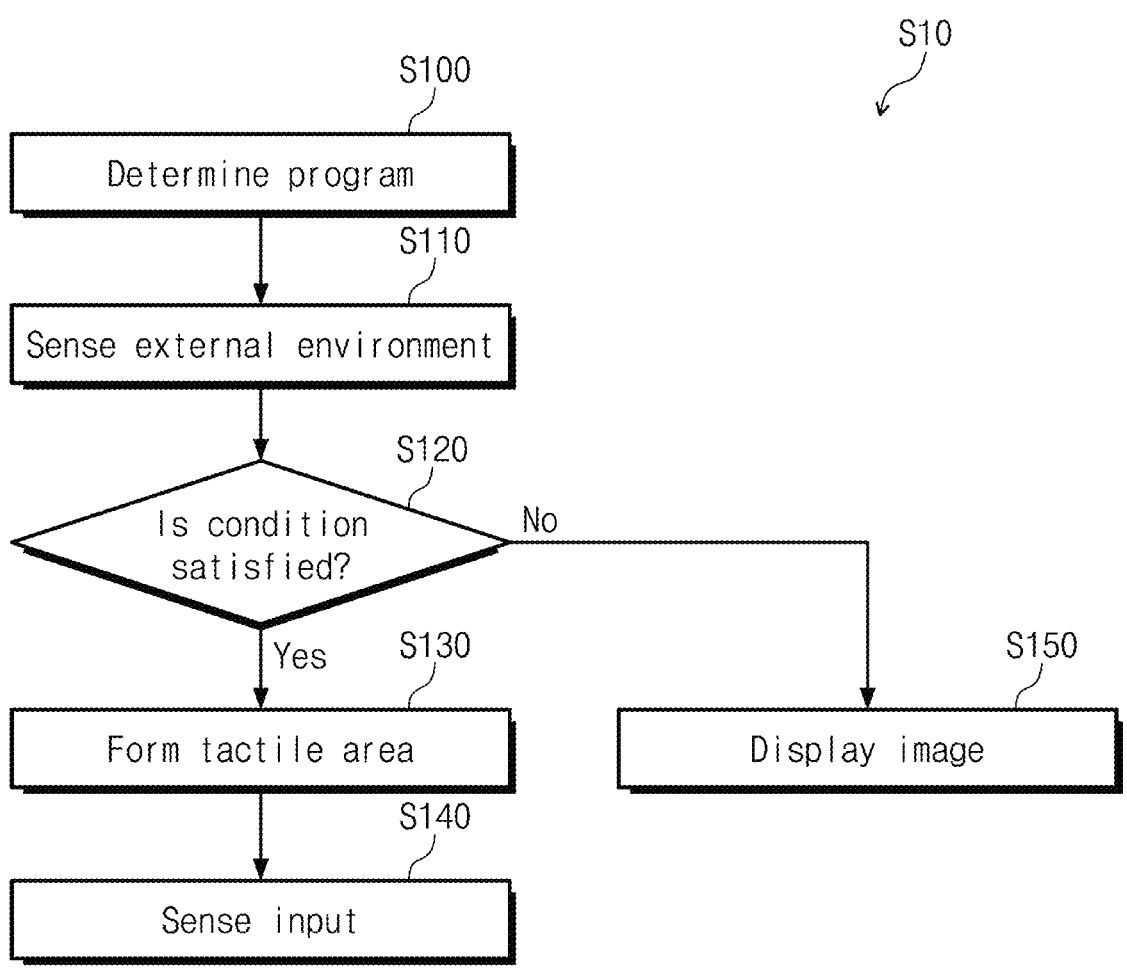
FIG. 6 is a flowchart showing an operation of an electronic device according to an exemplary embodiment of the disclosure.

FIG. 3 is a perspective view showing the electronic device 10 according to an exemplary embodiment of the disclosure. FIGS. 4 and 5 are views showing environments in which the user uses the electronic device 10 according to an exemplary embodiment of the disclosure. FIG. 6 is a flowchart showing an operation of (or a method of controlling) the electronic device 10 according to an exemplary embodiment of the disclosure.

FIG. 3 shows an environment in which the electronic device 10 receives an incoming call. In a case that electronic device 10 receives the incoming call from an external source (not shown) through the communication unit 170 (refer to FIG. 2), the electronic device 10 executes a phone call receiving program to receive the incoming call. The control unit 110 (refer to FIG. 2) determines which program to run and controls the determined program.

When the phone call receiving program runs, various information related to an incoming call is displayed in the display area DA.

In addition, the display area DA includes tactile areas SA1, SA2 and SA3 corresponding to the phone call receiving program. The tactile areas SA1, SA2 and SA3 are formed by protruding or recessing portions of the display area DA. FIG. 3 shows an embodiment where the tactile areas SA1, SA2 and SA3 are protruded, but not being limited thereto. Alternatively, the tactile areas SA1, SA2 and SA3 may be recessed. Herein, the tactile areas may be understood as three-dimensional areas defined in three dimension within the display area DA.

In an exemplary embodiment of the disclosure, the tactile areas SA1, SA2 and SA3 include a receiving area SA1, a rejection area SA2, and an important phone call notification area SA3.

In such an embodiment, the phone call receiving program may be controlled based on an external input, e.g., a user's touch, a swipe, etc., applied to the tactile areas SA1, SA2 and SA3. Herein, the user's touch or the swipe may be understood to include a concept to sense not only a contact but also a pressure applied to the tactile areas. Herein, the swipe may be understood to indicate rubbing an object.

When the external input is applied to the receiving area SA1, the user may accept the incoming call and talk to the other party. When the external input is applied to the rejection area SA2, the user may reject the incoming call.

The memory unit 120 (refer to FIG. 2) may store contact information, and at least one contact information may be selected by the user. The important phone call notification area SA3 may be activated when the incoming call is from the people selected by the user. Accordingly, the important phone call notification area SA3 may help to determine whether the incoming call is important.

In an exemplary embodiment, as shown in FIG. 3, the receiving area SA1 may have a circular shape, the rejection area SA2 may have an X-like shape, and the important phone call notification area SA3 may have a quadrangular shape, but they should not be limited thereto or thereby. In such an embodiment, the shapes of the tactile areas SA1, SA2, and SA3 may be variously modified.

The tactile areas SA1, SA2 and SA3 allow the user to control the electronic device 10 without visually checking the display area DA.

FIG. 4 shows an environment in which the user controls the electronic device 10 without taking the electronic device 10 out of his/her pocket.

FIG. 5 shows an environment in which the user is in a predetermined place, e.g., a movie theater, where it is difficult to visually check the electronic device 10, that is, the user is in an environment where the user may not effectively view the visual information displayed on the electronic device 10. FIG. 6 shows the operation of the electronic device 10 when the user is in the place where it is difficult to visually check the electronic device 10, as shown in FIG. 5.

Referring to FIG. 6, an operation S10 of (or a method of controlling) the electronic device 10 includes an operation of determining a program S100, an operation of sensing an external environment S110, an operation of determining whether a condition is satisfied S120, an operation of forming a tactile area S130, an operation of sensing an input S140, and an operation of displaying an image S150.

In the program determination operation S100, the electronic device 10 may determine what program is running in the electronic device 10. In one exemplary embodiment, for example, the electronic device 10 may determine whether the phone call receiving program is running.

In the external environment sensing operation S110, the electronic device 10 may sense the external environment (or use environment) thereof, e.g., a location of the electronic device 10, a location of the user, or a situation of the user. In an exemplary embodiment, the electronic device 10 senses information about various external environments through the sensor unit 150 (refer to FIG. 2) and senses the location of the electronic device 10, the location of the user, or the situation of the user based on the sensed information. In one exemplary embodiment, for example, the electronic device 10 may determine that the user is in the movie theater based on information, indicating that user's surroundings are dark, which is obtained by the illuminance sensor, information indicating that the electronic device is located near the movie theater, which is obtained by the GPS sensor, or information indicating that a sound from inside the movie theater is detected, which is obtained by the sound sensor.

In the condition satisfaction determination operation S120, the electronic device 10 may determine whether the user is in the place where it is difficult to visually check the electronic device 10. In one exemplary embodiment, for example, when the user is in the movie theater, the electronic device 10 may determine that the user is in the situation that is difficult to visually check the electronic device 10. In a case that the condition is not satisfied in the condition satisfaction determination operation S120, the operation of the electronic device 10 proceeds to the image display operation S150. In the image display operation S150, the tactile areas SA1, SA2 and SA3 are not formed in the display area DA of the electronic device 10, and only the image is displayed through the display area DA of the electronic device 10. In a case that the condition is satisfied in the condition satisfaction determination operation S120, the operation of the electronic device 10 proceeds to the tactile area forming operation S130. Information about the condition to be satisfied in the condition satisfaction determination operation S120 may be stored in the memory unit 120 (refer to FIG. 2).

In the tactile area forming operation S130, the tactile areas SA1, SA2, and SA3 may be formed in the display area DA of the electronic device 10. In one exemplary embodiment, for example, the receiving area SA1, the rejection area SA2 and the important phone call notification area SA3 may be formed, and the user may determine whether the incoming call is important through the important phone call notification area SA3.

In the input sensing operation S140, the electronic device 10 may sense the external input, such as the user's touch or the user's swipe, applied to the tactile areas SA1, SA2 and SA3. In one exemplary embodiment, for example, the user may apply the input such as the touch or the swipe to the receiving area SA1 or the rejection area SA2 to determine whether he or she will receive or reject the phone call.

Figure 7:
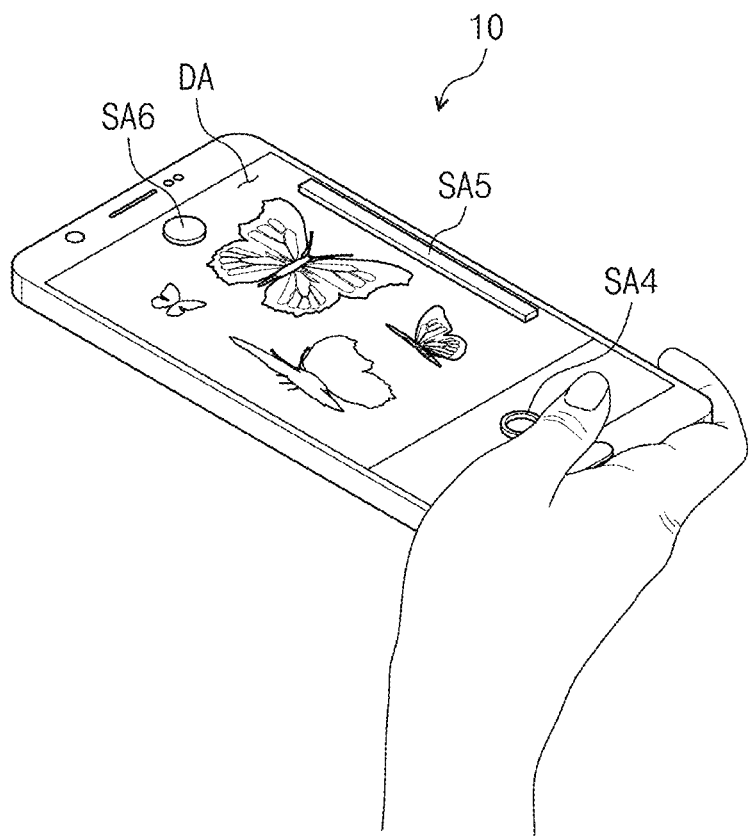
FIG. 7 is a view showing an electronic device used by a user according to an exemplary embodiment of the disclosure.
Figure 7:
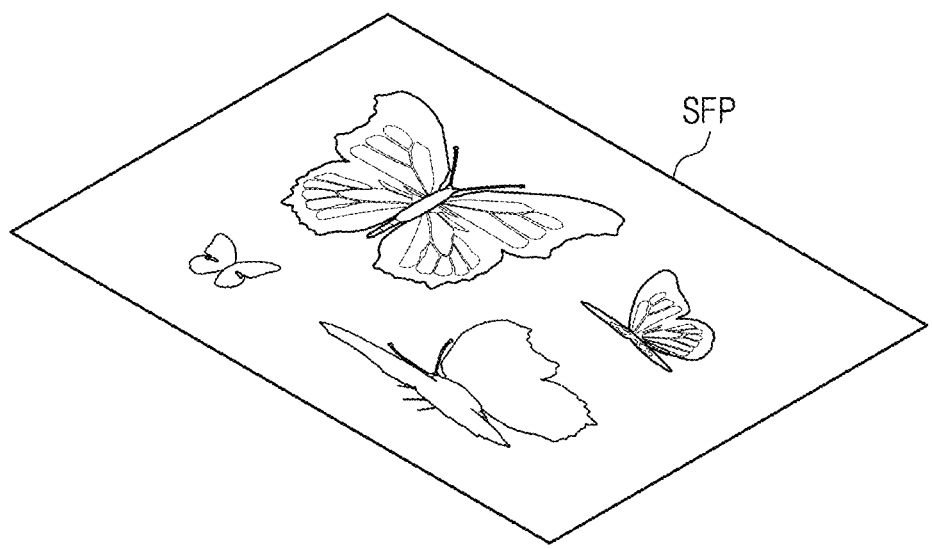

FIG. 7 is a view showing the electronic device 10 used by the user according to an exemplary embodiment of the disclosure. In FIG. 7, the user is taking a picture of a subject SFP using the electronic device 10. FIG. 7 shows a paper on which butterflies are drawn as the subject SFP.

When taking a picture using the electronic device 10, a camera program that drives the camera unit 160 (refer to FIG. 2) is executed or run. The control unit 110 (refer to FIG. 2) may determine whether the camera program runs.

In an exemplary embodiment, when the camera program runs, tactile areas SA4, SA5 and SA6 may be formed in the display area DA. The tactile areas SA4, SA5 and SA6 include a shutter area SA4 and exposure control areas SA5 and SA6. The exposure control areas SA5 and SA6 include an aperture value control area SA5 and a shutter speed control area SA6.

The user may apply the external input, such as the touch, the swipe, etc., to the shutter area SA4 to take the picture. In such an embodiment, the user may apply the external input, such as the touch, the swipe, etc., to the aperture value control area SA5 and the shutter speed control area SA6 to control an amount (i.e., an exposure value) of light provided to the image sensor of the camera unit 160.

In an exemplary embodiment of the disclosure, when the external input is applied to the aperture value control area SA5 or the shutter speed control area SA6 and the aperture value or the shutter speed is changed, a size of the aperture value control area SA5 or the shutter speed control area SA6 may be changed. In one exemplary embodiment, for example, where the aperture value control area SA5 has a bar shape, a length or a thickness of the aperture value control area SA5 may be changed. In one exemplary embodiment, for example, where the shutter speed control area SA6 has a circular shape, a size of the circle of the shutter speed control area SA6 may be changed. However, the shapes of the aperture value control area SA5 and the shutter speed control area SA6 should not be limited thereto or thereby.

According to an alternative exemplary embodiment of the disclosure, the exposure control areas SA5 and SA6 may be provided in a same area without being separated into the aperture value control area SA5 and the shutter speed control area SA6.

Figure 8:
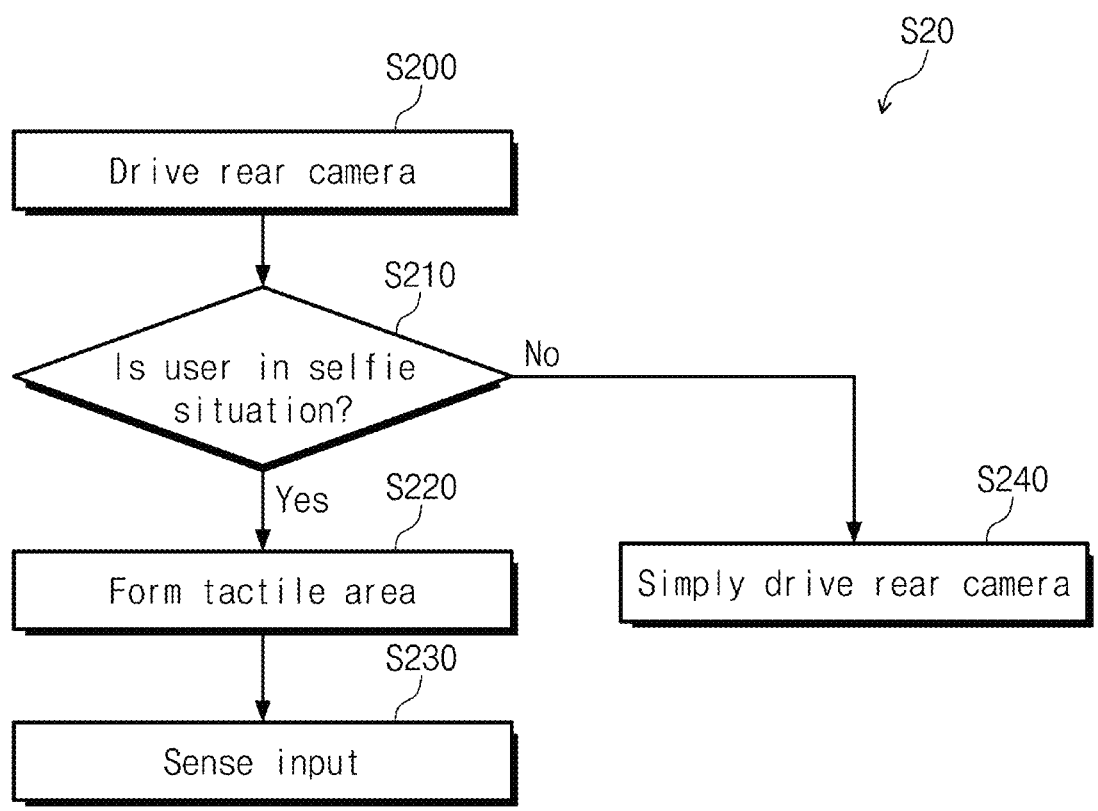
FIG. 8 is a flowchart showing an operation of an electronic device according to an exemplary embodiment of the disclosure.

FIG. 8 is a flowchart showing an operation of (or a method of controlling) the electronic device 10 according to an exemplary embodiment of the disclosure. In detail, FIG. 8 shows the operation of the electronic device 10 when the user takes a picture of herself/himself (e.g., a selfie) using the rear camera unit 160B (refer to FIG. 1B) of the electronic device 10.

The operation S20 of the electronic device 10 includes an operation of driving the rear camera unit S200, an operation of determining whether the user takes the selfie S210, an operation of forming the tactile area S220, an operation of sensing the input S230, and an operation of simply driving the rear camera unit S240.

In the rear camera driving operation S200, the electronic device 10 may activate the rear camera unit 160B (refer to FIG. 1B).

In the selfie determination operation S210, the electronic device 10 may determine whether the user is taking the selfie. In one exemplary embodiment, for example, the electronic device 10 may determine whether the user is taking the selfie by analyzing data about a user's face through the rear camera unit 160B (refer to FIG. 1B) or by analyzing movement of the electronic device 10 through the sensor unit 150 (refer to FIG. 2). In an exemplary embodiment, when the electronic device 10 determines that the user is not taking a selfie in the selfie determination operation S210, the electronic device 10 proceeds to the operation of simply driving the rear camera unit 160B (refer to FIG. 1B) S240. In such an embodiment, when the electronic device 10 determines that the user is taking a selfie in the selfie determination operation S210, the electronic device 10 proceeds to the tactile area forming operation S220.

In the tactile area forming operation S220, the electronic device 10 may form the tactile areas SA4, SA5 and SA6 in the display area DA.

In the input sensing operation S230, the electronic device 10 may sense the external input, such as the touch, the swipe, etc., applied to the tactile areas SA4, SA5 and SA6.

Typically, a user takes a selfie using the front camera unit 160A (refer to FIG. 1A). However, a user may take a selfie using the rear camera unit 160B when the user desires to take a selfie with a higher resolution. When the user takes a selfie using the rear camera unit 160B, it may be inconvenient for the user to control an operation of the rear camera unit 160B when the user is able to visually recognize the display area DA on a front side. Accordingly, in an exemplary embodiment, the tactile areas SA4, SA5 and SA6 are formed when the user takes a selfie using the rear camera unit 160B, such that the user may easily take the picture using her or his tactile sense.

Figure 9A:
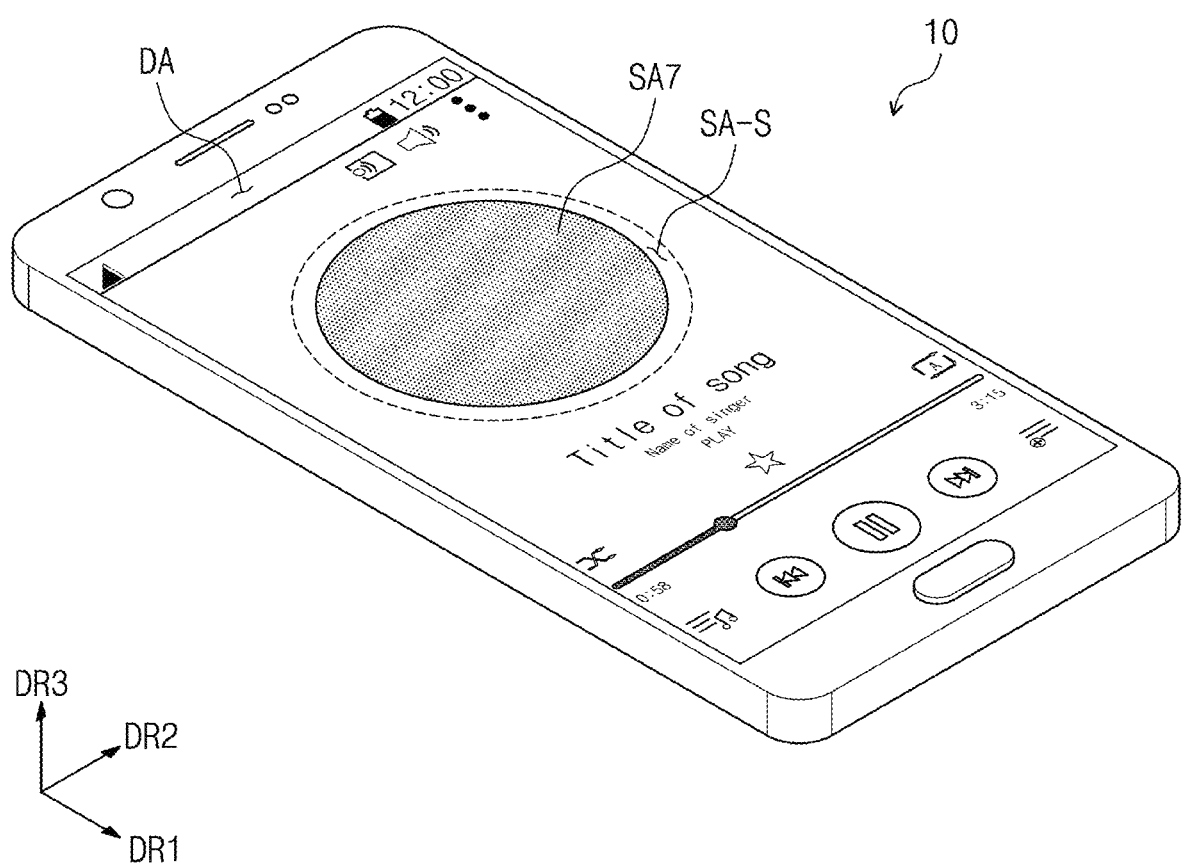
FIGS. 9A, 9B, and 9C are perspective views showing an electronic device according to an exemplary embodiment of the disclosure.
Figure 9B:
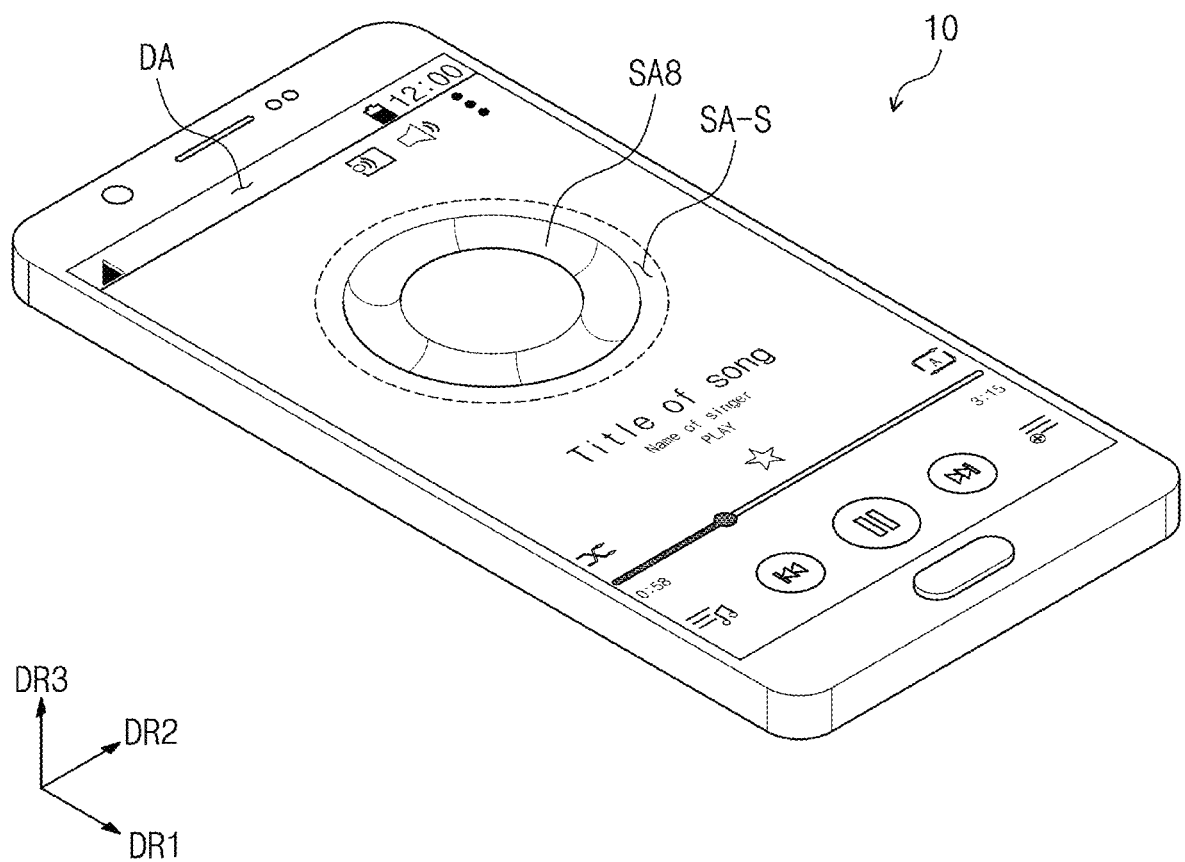
Figure 9C:
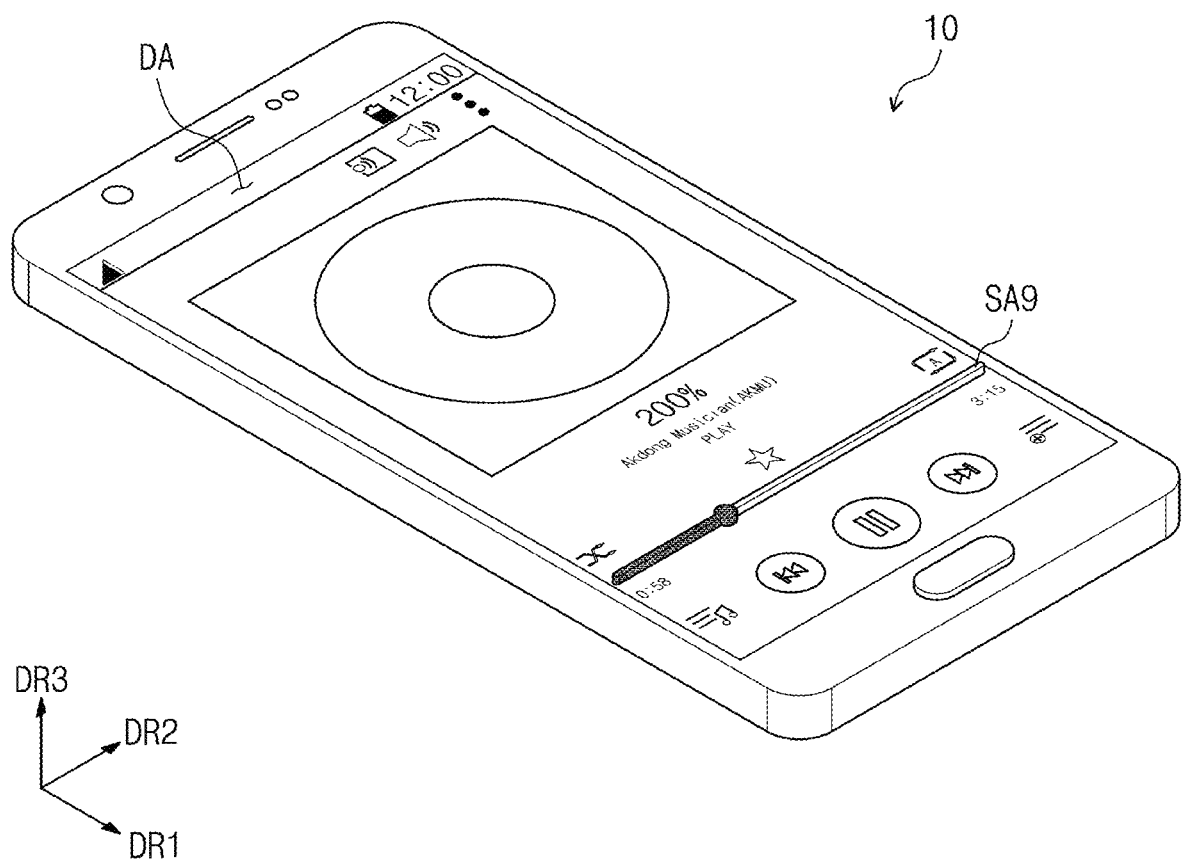

FIGS. 9A, 9B and 9C are perspective views showing an electronic device 10 according to an exemplary embodiment of the disclosure. In an exemplary embodiment, the electronic device 10 may play media files, e.g., an audio file, a video file, etc., using a player program. FIGS. 9A to 9C show an exemplary embodiment where the electronic device 10 plays an audio file, but it should not be limited thereto or thereby. That is, technical features shown in FIGS. 9A to 9C may be applied to an operation of playing a video file.

Referring to FIG. 9A, when the player program is executed, a tactile area SA7 may be formed in the display area DA. In an exemplary embodiment, the tactile area SA7 may be referred to as a "play file control area SA7" that controls the file played. In FIG. 9A, the play file control area SA7 is protruded to the third direction DR3, but it should not be limited thereto or thereby. According to an alternative exemplary embodiment of the disclosure, the play file control area SA7 may be recessed.

A peripheral area SA-S corresponds to a predetermined area surrounding the play file control area SA7.

The user may touch or swipe at least one area of the play file control area SA7 and the peripheral area SA-S to control the file being played or to be played.

In an exemplary embodiment of the disclosure, the user may touch or swipe at least one area of the play file control area SA7 and the peripheral area SA-S to control a play position in the file being played or a position in a seek slider indicating the playback progress of the file being played. In such an embodiment, the user may control the play position in the file being played through an operation of swiping the user's finger along an edge of the play file control area SA7.

In such an embodiment, the play file control area SA7 may be referred to as a "play position search area SA7". In an exemplary embodiment, as shown in FIG. 9A, a file may have a play time of about 3 minutes 15 seconds, in which a 58-second position is played.

The user may change the 58-second position at which the file is being played to other positions through the play position search area SA7.

According to an alternative exemplary embodiment of the disclosure, the user may touch or swipe at least one area of the play file control area SA7 and the peripheral area SA-S to control a sound volume of the file being played. In such an embodiment, the user may control the sound volume of the file being played through an operation of swiping the user's finger along the edge of the play file control area SA7.

In such an embodiment, the play file control area SA7 may be referred to as a "sound volume control area SA7".

According to another alternative exemplary embodiment, the user may touch or swipe at least one area of the play file control area SA7 and the peripheral area SA-S to search for a list of files that may be played. In such an embodiment, the user may search for a list of files that may be played through an operation of swiping the user's finger along the edge of the play file control area SA7.

In such an embodiment, the play file control area SA7 may be referred to as a "list search area SA7".

Referring to FIG. 9B, a tactile area SA8 having a ring shape may be formed in the display area DA. In such an embodiment, the tactile area SA8 may be formed by recessing a portion of the display area DA in the ring shape.

A peripheral area SA-S corresponds to a predetermined area surrounding the tactile area SA8.

Operations performed through the tactile area SA8 and the peripheral area SA-S shown in FIG. 9B are substantially the same as those described with reference to FIG. 9A, and thus any repetitive detailed description thereof will be omitted for convenience of description.

Referring to FIG. 9C, a tactile area SA9 having a bar shape may be formed in the display area DA.

Operations performed through the tactile area SA9 shown in FIG. 9C are substantially the same as those described with reference to FIG. 9A, and thus any repetitive detailed description thereof will be omitted for convenience of description.

Figure 10:
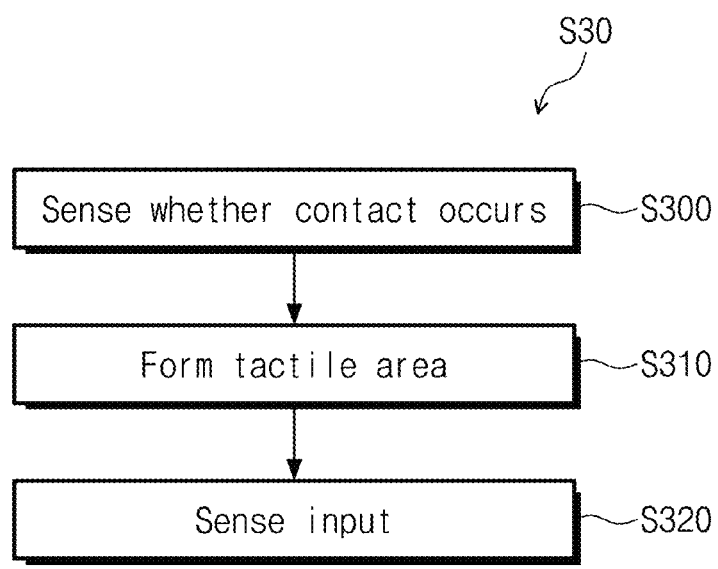
FIG. 10 is a flowchart showing an operation of an electronic device according to an exemplary embodiment of the disclosure.

FIG. 10 is a flowchart showing an operation of (or a method of controlling) the electronic device 10 (refer to FIG. 9A) according to an exemplary embodiment of the disclosure. In detail, FIG. 10 shows an operation of controlling the media file using the electronic device 10 by the user.

The operation S30 of the electronic device 10 may include an operation of sensing whether a contact occurs S300, an operation of forming the tactile area S310, and an operation of sensing the input S320.

In the contact sensing operation S300, the electronic device 10 may sense whether the user's finger makes contact with the display area DA.

In the tactile area forming operation S310, the tactile area may be formed in the display area DA to correspond to a portion with which the user's finger makes contact. In one exemplary embodiment, for example, referring to FIG. 9A, the tactile area SA7 (or the play file control area) may be formed to be protruded corresponding to the sensing of the contact of the user's finger. Referring to FIG. 9B, the tactile area SA8 (or the play file control area) may be formed to be recessed corresponding to the sensing of the contact of the user's finger.

In the input sensing operation S320, the electronic device 10 may sense the external input, such as the touch, the swipe, etc., which is applied to the tactile areas SA7, SA8 and SA9 (refer to FIGS. 9A to 9C).

Figure 11:
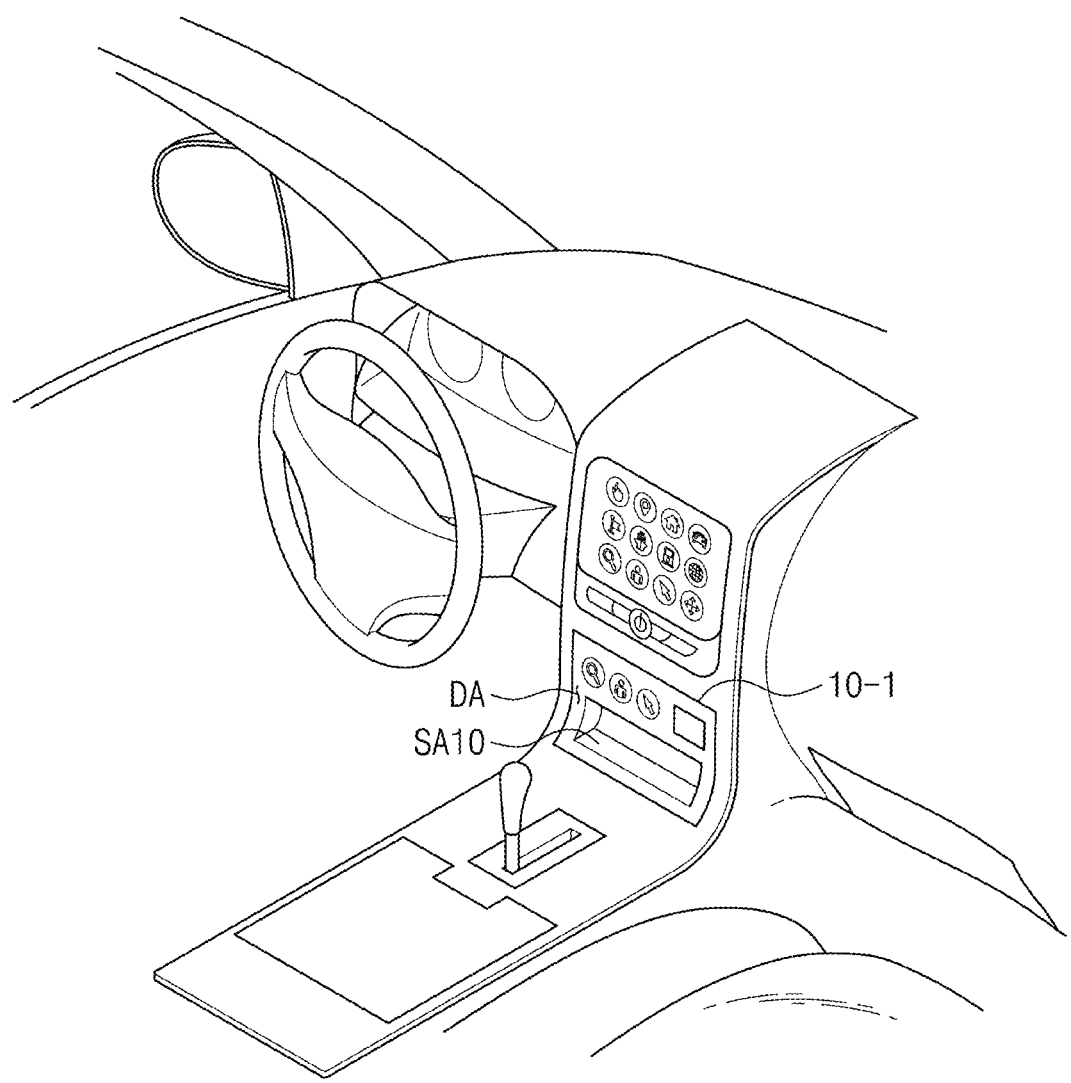
FIG. 11 is a view showing an environment of use of an electronic device according to an exemplary embodiment of the disclosure.

FIG. 11 is a view showing an environment to which an electronic device 10-1 is applied according to an exemplary embodiment of the disclosure. FIG. 11 shows a vehicle to which the electronic device 10-1 is applied.

A tactile area SA10 may be formed in a display area DA of the electronic device 10-1. Through the tactile area SA10, the user may control the electronic device 10-1 in a comfortable posture, which may not put strain on his/her hands or wrists.

In such an embodiment, the electronic device 10-1 have the same structure and function as those of the electronic device 10 (refer to FIG. 1A), and thus any repetitive detailed descriptions thereof will be omitted.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. An electronic device comprising:
   a memory unit which stores a plurality of programs;
   a control unit which determines a program to be executed among the programs to control the determined program;
   a display unit comprising a display area defined therein to display an image, wherein a portion of the display area is changed to be protruded or recessed in response to an operation of the determined program to form a tactile area; and
   an input sensor unit which senses an external input applied to the tactile area,
   wherein the control unit controls the determined program in response to the external input sensed by the input sensor unit,
   wherein the determined program is a player program, and the tactile area is defined by a portion corresponding to a touch portion where a user touches while the determined program is played, and
   wherein the tactile area is defined by protruding the touch portion.

2. The electronic device of claim 1, wherein
   the determined program is a phone call receiving program which determines whether to receive an incoming call, and the tactile area comprises:
   a receiving area to accept the incoming call; and a rejection area to reject the incoming call.

3. The electronic device of claim 2, wherein
   the memory unit further stores a plurality of contact information,
   at least one of the contact information is selected by a user, and the tactile area further comprises an important phone call notification area protruded or recessed when the incoming call is from the selected at least one of the contact information.

4. The electronic device of claim 2, further comprising:
a sensor unit which senses an external environment, wherein the sensor unit comprises at least one of an illuminance sensor which senses a brightness, a sound sensor which senses a sound, a position sensor which senses a position, an acceleration sensor which senses an acceleration, and a gyro sensor which senses an angular velocity,
wherein the tactile area is activated when the sensed external environment satisfies a predetermined condition.

5. The electronic device of claim 4, wherein the predetermined condition indicates that a user is in a movie theater.

6. The electronic device of claim 4, wherein
the predetermined condition is preset by a user, and
the preset condition is stored in the memory unit.

7. The electronic device of claim 1, further comprising: a camera unit which captures an image, wherein the determined program is a camera program to drive the camera unit, and wherein the tactile area comprises a shutter area to take a picture using the camera unit.

8. The electronic device of claim 7, wherein the tactile area further comprises an exposure control area to control an aperture value or a shutter speed of the camera unit.

9. The electronic device of claim 8, wherein the exposure control area has a size varying as the aperture value or the shutter speed is changed.

10. The electronic device of claim 8, wherein the camera unit comprises:
a front camera unit which captures an image in a front direction in which the image is displayed through the display area; and
a rear camera unit which captures an image in a rear direction opposite to the front direction, and
wherein the shutter area and the exposure control area are activated when a user takes a selfie using the rear camera unit.

11. The electronic device of claim 1, wherein
the determined program is a player program to play an audio file or a video file, and
the tactile area comprises a play position search area to control a position in the audio file or the video file being played.

12. The electronic device of claim 1, wherein the determined program is a player program to play an audio or a video file, and the tactile area comprises a sound volume control area to control a sound volume of the audio or video file being played.

13. The electronic device of claim 1, wherein
the determined program is a player program to play an audio file or a video file, and the tactile area comprises a list search area to search through a playlist of the audio or video files.

14. The electronic device of claim 1, wherein the tactile area is defined by recessing a peripheral area surrounding the touch portion.

15. A method of controlling an electronic device, the method comprising:
determining a program to be executed among a plurality of programs stored in the electronic device;
changing a portion of a display area of the electronic device to protruded or recessed to form a tactile area in response to an operation of the determined program; and
sensing an external input applied to the tactile area or an area adjacent to the tactile area;
wherein the determined program is a player program, and the tactile area is defined by a portion corresponding to a touch portion where a user touches while the determined program is played, and
wherein the tactile area is defined by protruding the touch portion.

16. The method of claim 15, further comprising:
controlling the determined program in response to the external input.

17. The method of claim 16, further comprising:
sensing an external environment, wherein the forming of the tactile area is performed when the sensed external environment satisfies a predetermined condition.

* * * * *